United States Patent [19]
Shmueli et al.

[11] Patent Number: 6,044,375
[45] Date of Patent: Mar. 28, 2000

[54] AUTOMATIC EXTRACTION OF METADATA USING A NEURAL NETWORK

[75] Inventors: Oded Shmueli, Nofit; Darryl Greig, Haifa, both of Israel; Carl Staelin, Palo Alto, Calif.; Tami Tamir, Haifa, Israel

[73] Assignee: Hewlett-Packard Company, Palo Alto, Calif.

[21] Appl. No.: 09/070,439

[22] Filed: Apr. 30, 1998

[51] Int. Cl.$^7$ .................................................. G06F 17/30
[52] U.S. Cl. ............................ 707/101; 707/102; 706/20; 706/934
[58] Field of Search ..................... 706/20, 934; 382/159, 382/161, 229; 707/100–102, 200

[56] References Cited

U.S. PATENT DOCUMENTS

| | | | |
|---|---|---|---|
| 4,758,980 | 7/1988 | Tsunekawa et al. | 364/900 |
| 4,912,653 | 3/1990 | Wood | 364/513 |
| 5,204,812 | 4/1993 | Kasiraj et al. | 364/419 |
| 5,235,654 | 8/1993 | Anderson et al. | 382/61 |
| 5,265,242 | 11/1993 | Fujisawa et al. | 395/600 |
| 5,390,259 | 2/1995 | Withgott et al. | 382/9 |
| 5,414,781 | 5/1995 | Spitz et al. | 382/296 |
| 5,416,849 | 5/1995 | Huang | 382/173 |
| 5,418,946 | 5/1995 | Mori | 395/600 |
| 5,463,773 | 10/1995 | Sakakibara et al. | 395/600 |
| 5,475,768 | 12/1995 | Diep et al. | 382/156 |
| 5,493,677 | 2/1996 | Balogh et al. | 395/600 |
| 5,521,991 | 5/1996 | Billings | 382/61 |
| 5,568,640 | 10/1996 | Nishiyama et al. | 395/600 |
| 5,574,802 | 11/1996 | Ozaki | 382/176 |
| 5,621,818 | 4/1997 | Tashiro | 382/227 |
| 5,628,003 | 5/1997 | Fujisawa et al. | 395/615 |
| 5,642,288 | 6/1997 | Leung et al. | 364/478.11 |
| 5,642,435 | 6/1997 | Loris | 382/229 |
| 5,675,710 | 10/1997 | Lewis | 395/10 |
| 5,924,090 | 7/1999 | Krellenstein | 707/5 |
| 5,937,084 | 8/1999 | Crabtree et al. | 382/137 |
| 5,970,482 | 10/1999 | Pham et al. | 706/16 |

OTHER PUBLICATIONS

C.W. Dawson et al., "Automatic Classification of Office Documents: Review of Available Methods and Techniques", Records Management Quarterly, Oct. 1995, pp. 3–18.

D. Savic, Automatic Classification of Office Documents: Review of Available Methods and Techniques, Records Management Quarterly, Oct. 1995, pp. 3–18.

S. Weibel et al., Automated Title Page Cataliging: A Feasibility Study, Information Processing and Management, vol. 25, No. 2, 1989, pp. 187–203.

*Primary Examiner*—Paul V. Kulik

[57] ABSTRACT

A method of automatically extracting metadata from a document. The method of the invention provides a computer readable document that includes blocks comprised of words, an authority list that includes common uses of a set of words, and a neural network trained to extract metadata from groupings of data called compounds. Compounds are created with one compound describing each of the blocks. Each compound includes the words making up the block, descriptive information about the blocks, and authority information associated with some of the words. The descriptive information may include such items as bounding box information, describing the size and position of the block, and font information, describing the size and type of font the words of the block use. The authority information is located by comparing each the words from the block to the authority list. The compounds are processed through the neural network to generate metadata guesses including word guesses, compound guesses and document guesses along with confidence factors associated with the guesses indicating the likelihood that each of the guesses is correct. The method may additionally include providing a document knowledge base of positioning information and size information for metadata in known documents. If the document knowledge base is provided, then the method includes deriving analysis data from the metadata guess and comparing the analysis data to the document knowledge base to determine metadata output.

16 Claims, 5 Drawing Sheets

6,044,375

AUTOMATIC EXTRACTION OF METADATA USING A NEURAL NETWORK

BACKGROUND OF THE INVENTION

1. Field of the Invention

The present invention relates generally to data archiving systems and more particularly to a method of automatically extracting metadata from documents for use in the data archiving systems.

2. Description of the Related Art

Metadata is data about data. In the case of documents, metadata includes pieces of information about each document such as "author," "title," "date of publication," and "type of document." As document databases become larger it becomes necessary to extract and organize metadata so that the desired documents can be quickly and easily found within the database. There has been a continuing need for a way to automatically, quickly and accurately extract metadata from documents as they are entered into data archiving systems. This need has been particularly acute when either the metadata or the document types, or both, are user-defined.

At one time metadata extraction was done manually. An operator would visually scan and mentally process the document to obtain the metadata. The metadata would then be manually entered into a database, such as a card catalogue in a library. This process was tedious, time consuming, and expensive. As computers have become more commonplace, the quantity of new documents including on-line publications has increased greatly and number of electronic document databases has grown almost as quickly. The old, manual methods of metadata extraction are simply no longer practical.

Computerized "keyword" searching has replaced much of the old manual metadata entry. In "keyword" searching, the entire textual portion of every document in a database is converted into computer-readable text using optical character recognition (OCR) techniques that are known in the art. Every word in every document is then catalogued in a keyword database that indicates what words appear in a particular document and how many times those words appear in the particular document. This allows users to select certain "keywords" that they believe will appear in the documents they are looking for. The keyword database allows a computer to quickly identify all documents containing the keyword and to sort the identified documents by the number of times the keyword appears in each document. Variations of the "keyword" search include automatically searching for plurals of keywords, and searching for boolean combinations of keywords.

"Natural language" searching followed "keyword" searching. "Natural language" searching allows users to enter a search query as a normal question. For example, a child trying to learn to pitch a baseball might search for references that would help by entering the query, "How do you throw a curveball?" The computer would then automatically delete terms known to be common leaving search terms. In this case the search terms would be "throw" and "curveball". The computer would then automatically broaden the set of search terms with plurals and synonyms of the original search terms. In the above example, the word "pitch" might be added to the list of search terms.

As in "keyword" searching, a keyword database is then searched. Relevant documents are picked and sorted based on factors such as how many of the search terms appear in a particular document, how often the search terms appear in a particular document, and how close together the search terms may be to one another within the document.

While "keyword" and "natural language" searches have helped users find the documents they are looking for, they are not particularly helpful when a user is attempting to glean a particular type of metadata, for example "authors whose last names begin with the letter Z", from all, or a particular subset, of the documents within a database. Thus it is still desirable to be able to classify metadata by type.

Because manual entry of the information is often not practical, as discussed above, several schemes have been used to automate the process. First, the manual burden has been shifted to those submitting the data for the database rather than those receiving the data. Those submitting may be required to fill in on-line or paper forms listing the requested metadata. The metadata listed on the on-line forms can be entered directly into the metadata database. The metadata listed on paper forms can be scanned and an OCR operation can be performed on the textual portions. Since each item of metadata is presumed to be in a defined location on the form, the metadata can be automatically gathered and entered into the appropriate locations in the database.

In the case of classes of documents having a standardized format, such as patents, pre-set locations on the documents are known to contain certain types of metadata. For example, on a United States patent, the patent number and date are both found in the upper right hand corner of the first page. In the case of documents having standardized formats, automatic entry of the metadata into a database is accomplished by performing an OCR operation on the particular portions of the document known to contain the desired metadata. Until the advent of the automatic document classifier the usefulness of this system was limited by the need to manually classify each document.

Automatic document classifiers are now known in the art. For example, a document classifier is disclosed in U.S. Pat. No. 5,675,710, entitled, "Method and Apparatus for Training a Text Classifier." Automatic entry of metadata from assorted types of standardized documents can now be achieved fairly reliably and inexpensively.

Also known in the art are entire document database systems that utilize many of the aforementioned techniques in combination. One such system is described in U.S. Pat. No. 5,628,003 entitled, "Document Storage and Retrieval System for Storing and Retrieving Document Image and Full Text Data."

From the foregoing it will be apparent that there still a need for a method to automatically extract metadata from non-standard documents. There is also a need to automatically extract metadata where the location of the metadata sought is not well defined within the document. Further, there is a need to automatically extract user-defined metadata from user-defined classes of documents.

SUMMARY OF THE INVENTION

The invention provides a method of automatically extracting metadata from documents. The method is adaptable to non-standard documents, unknown metadata locations and user-defined metadata. Using the method of the invention, more metadata can be extracted from documents with greater accuracy and reliability than was possible in the past.

The method of the invention begins by providing a computer readable document that includes blocks comprised of words, an authority list that includes common uses of a set of words, and a neural network trained to extract metadata from groupings of data called compounds. Providing a computer readable document may include scanning a paper document to create scanner output and then performing an optical character recognition (OCR) operation on the scanner output.

Next authority information associated with the words is located by comparing the words with the authority list. Information derived from the blocks of the document is grouped together by block. The groups of data are called compounds. One compound describes each of the blocks. Each compound includes the words associated with the blocks, descriptive information about the blocks and the words, and authority information associated with some of the words. Examples of descriptive information include bounding box information that describes the size and position of the block, and font information that describes the size and type of font used by the words.

The compounds are then processed through the neural network to generate metadata guesses. The metadata guesses may include compound guesses, with each compound guess describing possible block types for one of the blocks. Each compound guess may also include compound confidence factors indicating the likelihood that the possible block types are correct. The metadata guesses may also include document guesses that describe possible document types for the document. The document guess may include document confidence factors describing the likelihood that the possible document types are correct. Finally, the metadata guess may include word guesses, each word guess describing possible word types for one of the words. The word guesses may include word confidence factors indicating the likelihood that the possible word types are correct.

The metadata may then be derived from the metadata guesses by selecting those document, compound, and word guesses having the largest document, compound, and word confidence factors, respectively.

The method according to the invention may alternatively include providing a document knowledge base of positioning information and size information for metadata in known documents. If the document knowledge base is provided, then the method additionally includes deriving analysis data from the metadata guesses and comparing the analysis data to the document knowledge base to improve the metadata guesses. Examples of analysis data includes the function and proximity of neighboring blocks, the font size and type used, the position of the block on the page, and the compound confidence factor.

Other aspects and advantages of the invention will become apparent from the following detailed description, taken in conjunction with the accompanying drawings and the attached pseudo code listing, illustrating by way of example the principles of the invention.

DESCRIPTION OF THE PREFERRED EMBODIMENT

Figure 1:
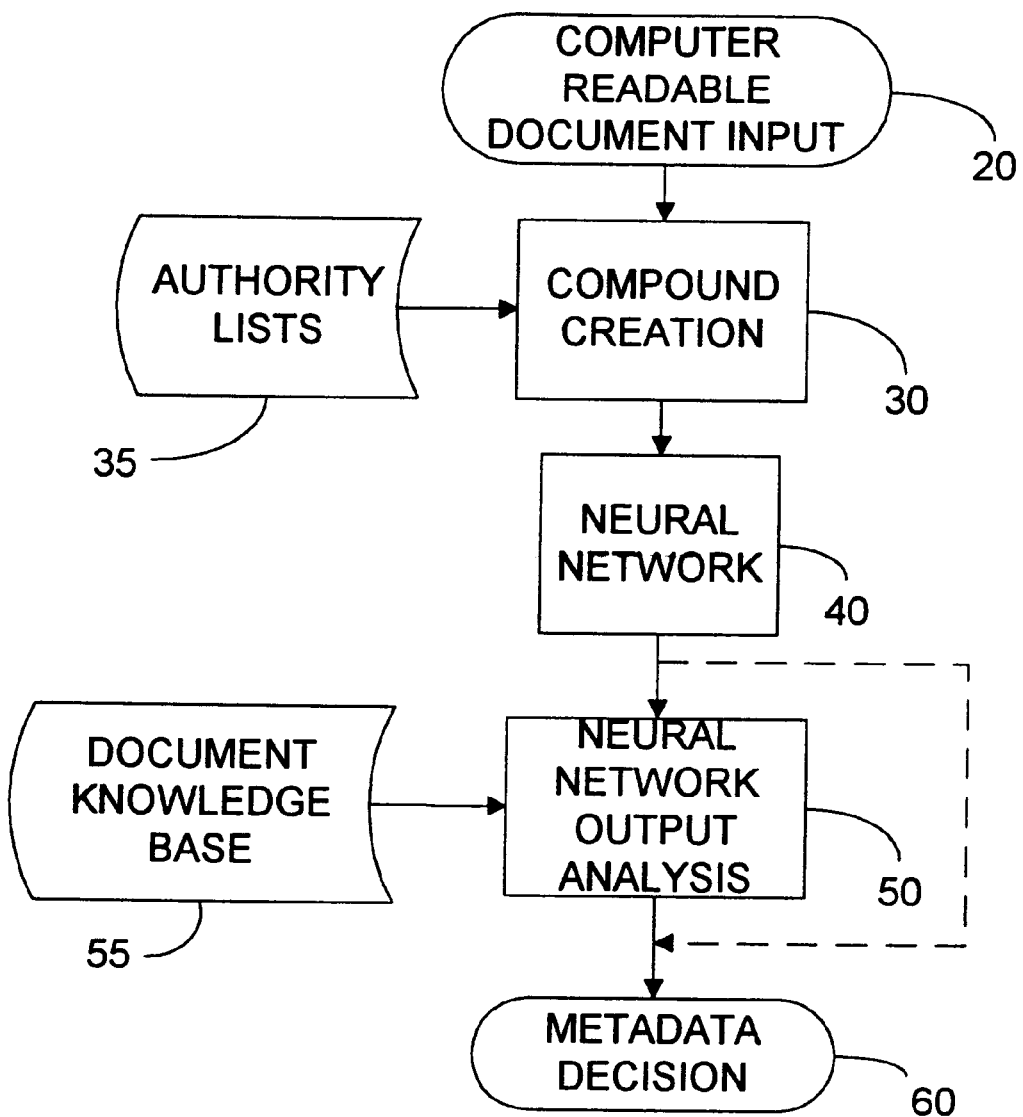
FIG. 1 is a flowchart depicting the method of the invention.

As shown in the drawings for purposes of illustration, the invention provides a method of extracting metadata from documents. The method is adaptable to non-standard documents, unknown metadata locations and user-defined metadata. Using the method of the invention, more metadata can be extracted from documents than was possible in the past.

In accordance with the invention, when metadata is extracted from a document, the method of the invention derives from the document packets of data called compounds. Each compound describes a distinct block in the document. The compounds are processed through a trained artificial neural network (neural network) which outputs metadata guesses. The metadata guesses can then be used to determine the metadata for the document. Alternatively, the metadata guesses may be analyzed and compared against a document knowledge base to determine the metadata. This method enables metadata to quickly and easily be extracted from each of the documents in the database and from new documents as they are added to the database.

FIG. 1 is a flowchart illustrating the method according to the invention of automatically extracting metadata from a document. First, a computer-readable document is provided (block 20). Groupings of data called compounds, each describing a distinct block of the computer-readable document, are then created (block 30). The compounds include information taken from both the computer readable document and from authority lists in response to the document (block 35). The compounds are then processed through a neural network (block 40). The neural network creates an output called metadata guesses which can be used to determine the metadata (block 60). Alternatively, the metadata guesses may then analyzed (block 50) and compared with a document knowledge base (block 55) to improve the metadata guesses. The improved metadata guesses are then used to determine the metadata (block 60). These steps will now be described in detail.

Figure 2:
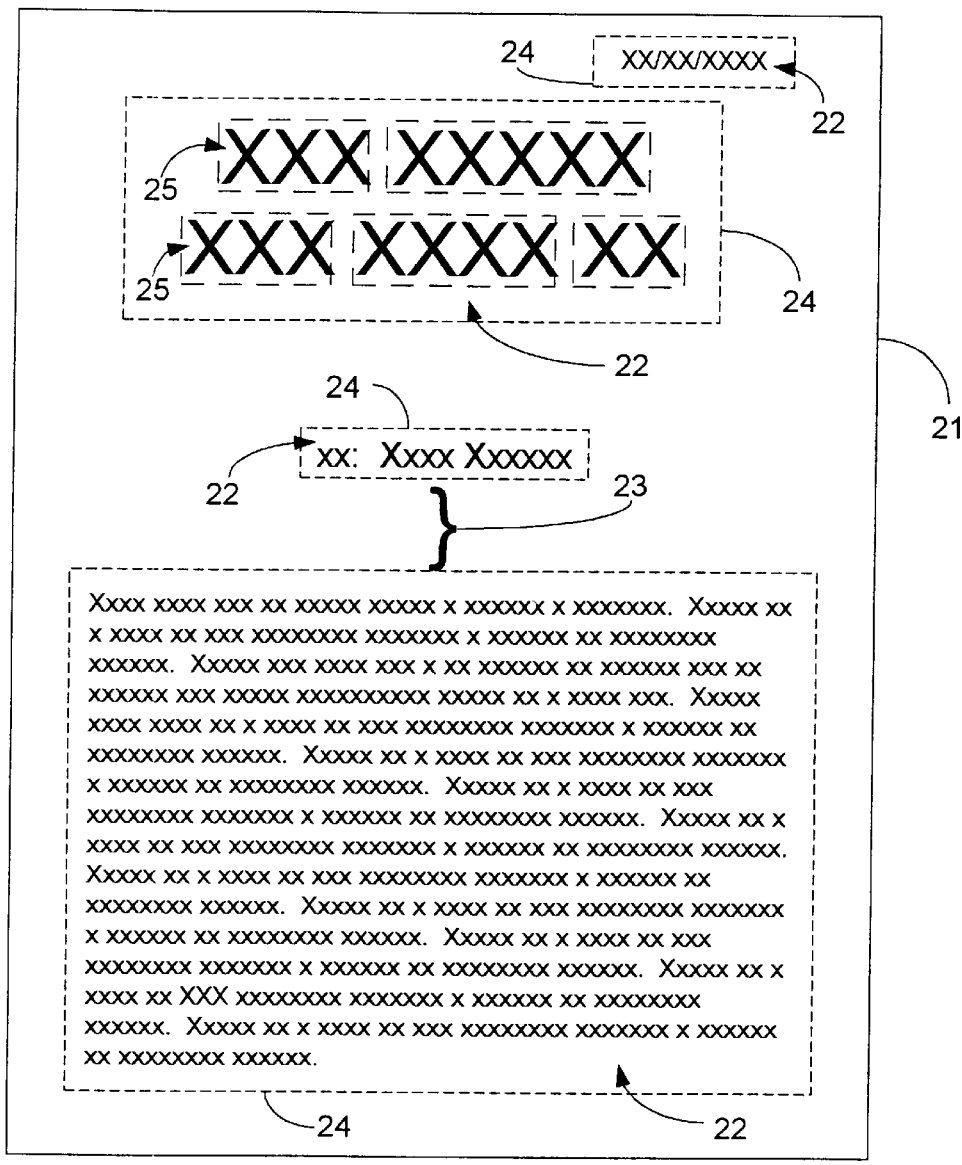
FIG. 2 is a plan view of a document.

An depiction of a computer readable document 21 is seen in FIG. 2. For purposes of this description a computer readable document includes any document which may be stored in a digital format by computer. In the preferred embodiment the computer readable document includes formatting data such as font size and type, text position, justification, spacing, etc. Formatting data is typically found in the output files of word processors and optical character recognition (OCR) systems that operate on the images of documents such as can be inputted through a document scanner. It is to be understood, however, that computer readable documents may include a vast range of different types of documents ranging from images of documents stored in a purely graphical format to pure textual documents containing nothing more than alphanumeric characters.

Figure 3:
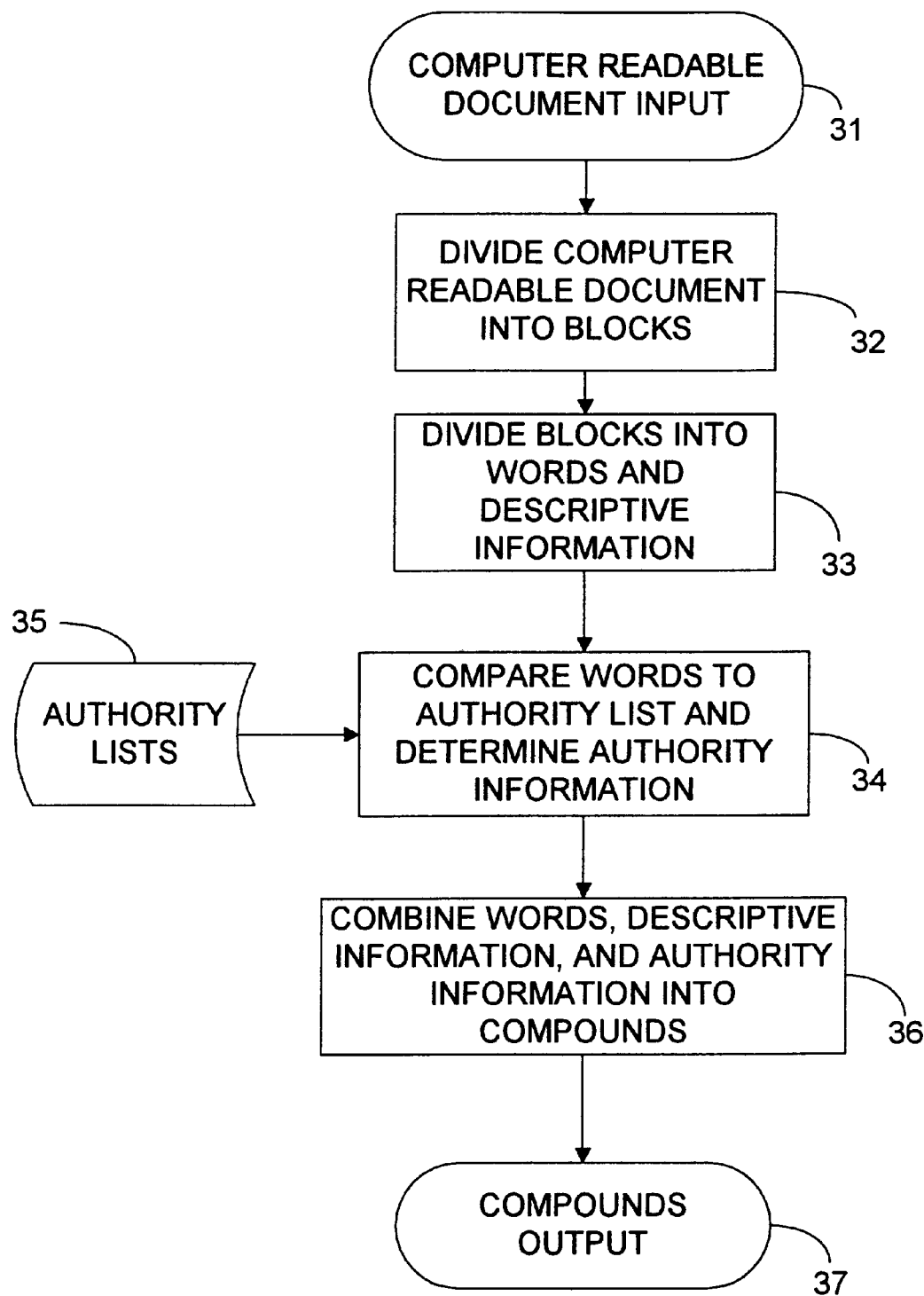
FIG. 3 is a flowchart depicting the preferred embodiment of the portion of the method described by the "compound creation" and "authority list" blocks of FIG. 1.

Once a computer readable document has been obtained, compounds must be created. For purposes of this description, a compound is a set of data describing a distinct block 22 of a computer readable document 21. FIG. 3 is a flowchart depicting a preferred method of creating the compounds according to the invention. In the following description of compound creation, references to the computer readable document refer back to FIG. 2.

Compound creation begins with the computer readable document (block 31). The computer readable document 21 is parsed into the individual blocks 22 that make up the computer readable document (block 32). Each block is typically separated from neighboring blocks by a blank portion of the document 23 that contains no information. A bounding box 24 can be drawn around each block to define its position. One type of block commonly found in computer readable documents are text blocks. Text blocks preferably contain both alphanumeric text and associated descriptive information about the text such as text position, text justification, and spacing. Another type of block found in computer readable documents are non-textual blocks. Non-textual blocks contain non-textual types of information such as a business logo.

Next, the alphanumeric text of each block 22 is parsed into words 25 that are separated from neighboring words by spaces or punctuation (block 33). For purposes of this description, words can include symbols, punctuation, numbers, abbreviations and any other alphanumeric combination. Each word preferably also has associated descriptive information such as capitalization, font type, font size, font style, and the position of the word within the text block.

Each of the words is then compared with an authority list 35 that has been previously prepared (block 34). The authority list is essentially a dictionary that lists many of the linguistic functions for words. The authority list can be very detailed and can be customized by users to suit the types of documents they use most frequently and user-defined metadata. Examples of types of word functions that may be in the authority list include:

| | |
|---|---|
| e-mail or surface addresses; | sequencer words (e.g., volume, edition); |
| prepositions; | years; |
| journal names; | months; |
| conference names; | times of year (e.g., summer); |
| copyright notice words; | symbols; |
| organizational names; | numbers; |
| magazine titles; | punctuations; |
| first names of people; | outline indicators (e.g., III.); and |
| last names of people; | names of known authors. |

As the words are compared with the authority list, all possible word functions indicated by the authority list for a particular word are associated with that particular word. This associated information is called the authority information of that word.

The comparison of the words with the authority list may also incorporate approximation matching. Approximation matching is where both the word and close approximations of the word are compared against the authority list. The close approximations are creating using methods known in the art. Approximation matching is particularly useful when a computer readable document has undergone an OCR operation that may leave slight errors in the words.

Next, the information derived from each block is combined (block 36). For text blocks, the combination includes the words, descriptive information for the block as a whole, and both the descriptive information and the authority information associated with each word. For non-textual blocks, the combination includes descriptive information for the block and information about the content of the block. The combination of information for each block is called a compound. When the compound creation process is completed, each text block has an associated compound (block 37).

The compounds are then processed through a trained neural network. Neural networks are known in the art. A neural network is a network of many simple processors (units), each possibly having a small amount of local memory. The units are connected by communication channels (connections) which usually carry numeric (as opposed to symbolic) data, encoded by any of various means. The units typically operate only on the data stored in their local memory and on the inputs they receive via the connections. Most neural networks have some sort of "training" rule where the weights of connections are adjusted on the basis of data. In other words, neural networks "learn" from examples (as children learn to recognize dogs from examples of dogs) and exhibit some capability for generalization beyond the training data.

According to Haykin, S. (1994), *Neural Networks: A Comprehensive Foundation*, N.Y.: Macmillan, p. 2: "A neural network is a massively parallel distributed processor that has a natural propensity for storing experiential knowledge and making it available for use. It resembles the brain in two respects:

1) Knowledge is acquired by the network through a learning process; and
2) Interneuron connection strengths known as synaptic weights are used to store the knowledge."

It is the ability of the neural network to learn that gives the method according to the invention one of its advantages over the prior art in the process of extracting metadata from documents. The ability to learn provides the flexibility and adaptability that make the method according to the invention adaptable to user-specified metadata and user-specified types of documentation.

Figure 4A:
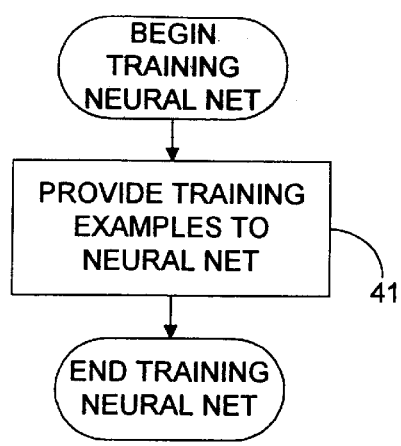
FIG. 4A is a flowchart depicting the preferred embodiment of the portion of the method described by the "neural network" block of FIG. 1.

Before the compounds can be processed through the neural network, however, the neural network must be trained. A flowchart showing the training of a neural network is shown in FIG. 4A. While the detailed process used will vary depending on the structure of the neural network that is used, the same basic process applies to all neural networks. That is, the neural network must be provided with training examples, each example indicating the desired output for a fixed set of input conditions (block 41).

In the preferred embodiment of the invention, the each neural network training example includes both an input part and an output part. The input part that includes compound information and word information. The compound information includes items that describe a block such as: 1) whether the block is centered; 2) the coordinates of the upper left corner of the bounding box surrounding the block; and 3) the coordinates of the lower right corner of the bounding box. The word information for each word includes items such as: 1) position of the word within the block; 2) size of the word (e.g., width and height within the block); 3) font size of word; 4) font style of word (e.g., bold, italics); 5) font type of word (e.g., Courier); and 6) all categories of authority information listed above.

The output part includes a document part, compound part, and word part. The document part includes a likelihood that the document might be each of a number of document types including, but not limited to: a technical report, a journal document, a conference document, a chapter, a patent, a news clip, or numerous other document types that can be specified by the user. It also includes the likelihood that the document is not of any known document type.

The compound part includes a likelihood that the block described by the compound information input might be each of a number of block types including, but not limited to: title, conference name, publication name, author name, date, copyright, thanks, keywords index, communication, running header, page numbers, or numerous other compound types that can be specified by the user. It also includes the likelihood that the block is not of any known block type.

The word part includes a likelihood that each word described by the word input might be each of a number of word types including, but not limited to, first name, last name, company name, journal name, conference name, organization name, magazine name, or numerous other word types that can be specified by the user. It also includes the likelihood that each word is not of any known word type.

Figure 4B:
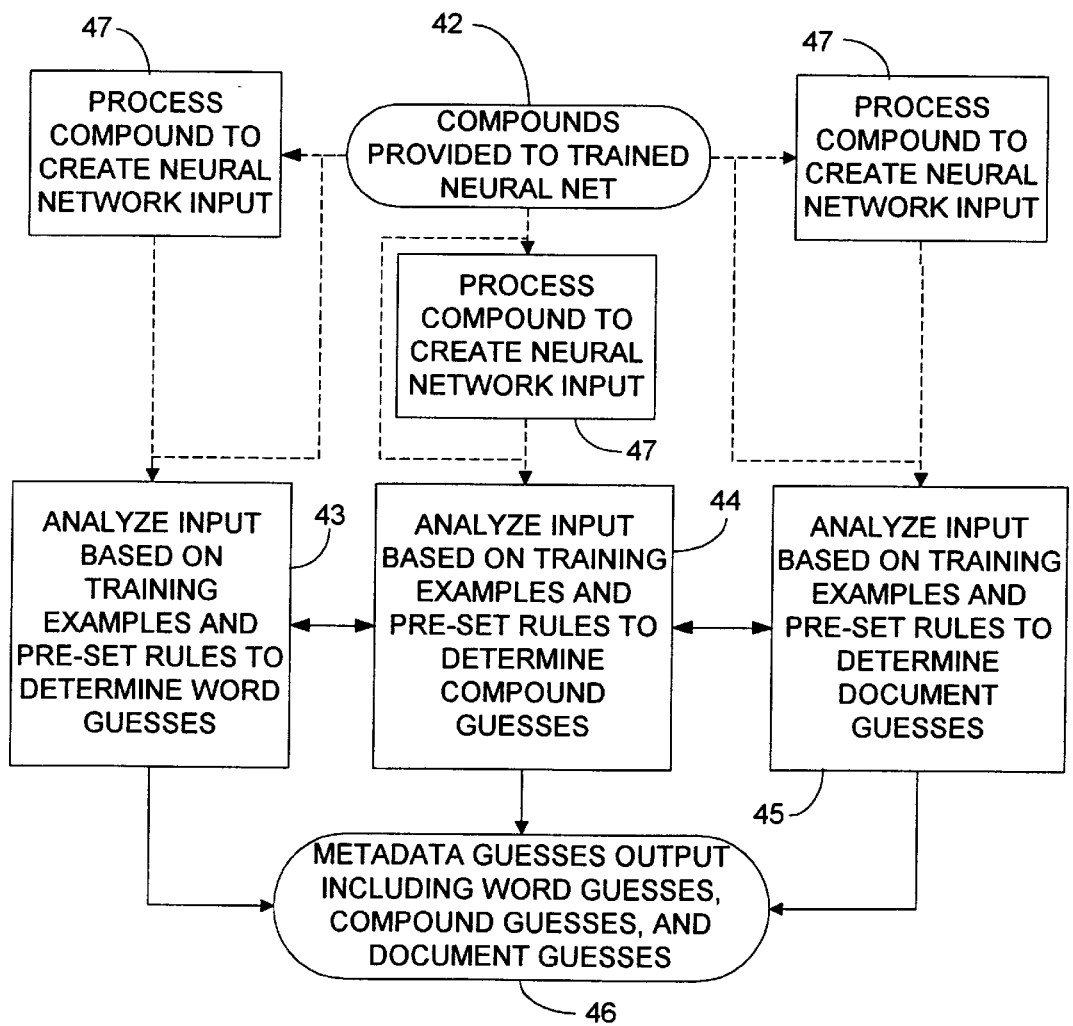
FIG. 4B is a flowchart depicting training of the neural network utilized in FIG. 4A.

Once the network has been trained, the compounds associated with each block can be processed through the neural network. A flowchart of this process is depicted in FIG. 4B. While the actual processing through the neural network varies depending on the structure of the neural network used, most neural networks would employ this general structure. First, the neural network takes the compounds as an input (block 42). While some neural networks may be able to take the compound information directly, others may require some input processing of the compounds to create the neural network input (block 47). For purposes of this description, the expression "processing the compound through a neural network" includes processing compounds that have undergone input processing to create the neural network input.

Input processing may include any process that converts the compound into a format that can be easily processed as a neural network input. Summarizing and sliding windows are two types of input processing. Summarizing is when key information from the words is used as a neural network input rather than using all the words as the neural network input. The key information may be sufficient for the neural network to make compound and document guesses. By limiting the number of inputs to the neural network by summarizing, the speed and occasionally the accuracy of the neural network processing can be improved.

Sliding windows is a technique for creating a neural network input that includes information not only about a particular item, but also information derived from a set number of items proceeding the particular item and possibly a set number of items following the particular item. For example, in making a word guess, the network may be provided with an input that includes not only information about the word in question, but also information derived from a preset number of words immediately proceeding and immediately following the word in question.

Next the neural network analyzes the inputs, either directly from the compounds or as processed, based on the training examples it has previously been supplied as well as against preset rules. A preset rule might include, for example, that a centered text block near the top of a page in a large font should be considered a probable title. Using the training examples and the preset rules, the neural network makes metadata guesses of three types for each compound: word guesses, a compound guess, and a document guess.

Word guesses (block 43) indicate possible word types for each word from the processed compound. The word guesses may also include word confidence factors. Word confidence factors are numeric values (typically between zero and one-hundred percent) that are associated with each word guess and indicate the likelihood that each possible word type indicated by the word guess is correct.

Similarly, the compound guess (block 44) indicates possible block types for the blocks associated with the processed compound. The compound guess may also include compound confidence factors. Compound confidence factors are numeric values (typically between zero and one-hundred percent) that are associated with the compound guess and indicate the likelihood that each possible block type indicated by the compound guess is correct.

Finally, the document guess (block 45) indicates possible document types based on the processed compound. The document guess may also include document confidence factors. Document confidence factors are numeric values (typically between zero and one-hundred percent) that are associated with the document guess and indicate the likelihood that each possible document type indicated by the document guess is correct.

It is important to note that the neural network does not determine the word guesses, compound guesses, and document guesses independently. In fact the neural network processes all three types of guesses simultaneously utilizing intermediate results in the determination of each type of guess as an analysis factor in the determination of the other two types of guesses. Thus, the intermediate results in the determination of a compound guess may be used as a factor in determining both the document guess and the word guesses. As a result, some of the word confidence factors, for example, may be altered.

For purposes of this description, the term neural network may include multiple neural networks. In fact, depending on the neural network used, it may most efficient to used three separate neural networks in place of the one described above. One of the neural networks can be specially configured and trained to determine word guesses, one can be specially configured and trained to determine compound guesses, and one can be specially configured and trained to determine document guesses.

Alternatively, multiple neural networks can be configured with each neural network being specially configured and trained to determine metadata guesses for particular document types. Thus, after classifying the document, the metadata can be extracted from the document with a neural network that has been specially configured and trained for that type of document. This method may be particularly effective when users add new metadata types.

Figure 5:
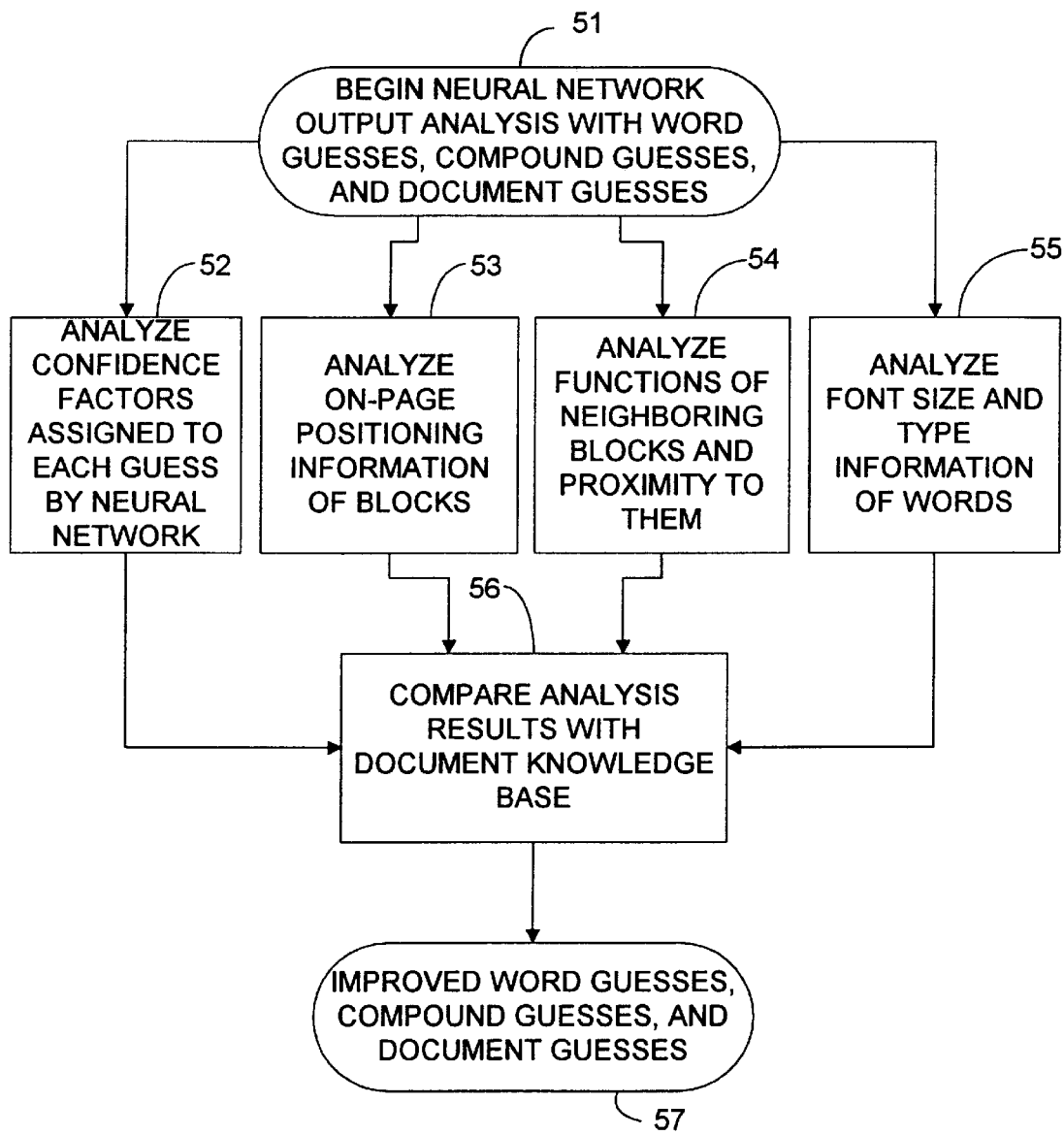
FIG. 5 is a flowchart depicting the preferred embodiment of the portion of the method described by the "neural network output analysis" and "document knowledge base" blocks of FIG. 1.

When all of the compounds have been processed through the neural net, metadata may be determined by selecting from the word guesses, compound guesses and document guesses having the highest word, compound, and document confidence factors, respectively. Alternatively, however, the metadata guesses may be improved prior to determining the metadata through additional analysis that will ultimately result in improved accuracy and reliability of the metadata extracted from the document. FIG. 5 is a block diagram depicting the additional analysis.

The additional analysis portion of the method according to the invention involves two steps: 1) deriving analysis data (blocks 52 through 55) from the metadata guesses (block 51); and 2) comparing the analysis data with a predefined document knowledge base (block 56) to improve the metadata guesses. The document knowledge base may include such information as the positioning and sizing of information in known documents. The improved metadata guesses are then used to determine the metadata (block 57).

Analysis data can include the raw metadata guesses including word guesses, compound guess and the document guess for each compound processed though the neural network along with their respective confidence factors (block 52). In addition analysis data may include data derived from these raw guesses. For example, it can be very helpful in determining the function of a particular block of a document to know the function of the blocks (both textual and non-textual) that neighbor the particular block (block 54). The functions of neighboring blocks can be derived from the compound guesses describing the neighboring blocks. Similarly, knowing the positions of neighboring blocks may be helpful in determining the function of a particular block. Data describing the relative positions of neighboring blocks is called proximate block position data (block 54). The proximate block position data can be derived by comparing bounding box information from the compound describing the particular block with the bounding box information from the compounds describing the neighboring blocks.

Furthermore, the position of a particular block on a page often helps define its function (block 53). The page position for a particular block can also be derived from the bounding box information taken from the compound describing the block. The page position data can also be part of the analysis data described above. Similarly, the font size and type can be useful in determining the purpose of a particular text block or of a particular word within the text block (block 55). For example, items in particularly large fonts are more likely to be titles. The font size and type information for each word of a text block may also be included in the analysis data described above.

Once the analysis data has been derived, it is compared with a preexisting document knowledge base (block 56) to determine which, if any, of the word, compound, and document confidence factors should be changed to improve the word, compound, and document guesses, respectively (block 57). The document knowledge base contains information about the metadata position and size in a pool of known documents. The knowledge base may also be dynamic and arranged to include information about each of the documents that has had metadata automatically extracted using this method. The weight given to each piece of analysis data in this comparison is typically not equal and may be adjusted. Once each piece of analysis data has been compared against the knowledge base, and the metadata has been improved, the metadata can be derived from the metadata guesses. This is done by selecting the word guesses, compound guesses, and document guesses with the highest word, compound, and document confidence factors, respectively.

Once the metadata has been derived, the user may verify and, if necessary, correct the automatically extracted metadata. If correction by the user is necessary, the corrected information may be used to improve the knowledge base so future errors of this type will be less likely.

In the preferred embodiment of the method according to the invention, the various steps described above are performed by a computer. In light of this fact and in order to provide a more detailed description of the method according to the invention, a listing of pseudo code for running the method on a computer is attached.

Although a specific embodiment of the invention has been described and illustrated, the invention is not to be limited to the specific forms or arrangements of parts so described and illustrated. The invention is limited only by the claims.

PSEUDO CODE LISTING

Assumptions:

[1] we receive from an OCR system an ocrPage object. This object has an attribute which is an array of word strings, where a word is a white space delineated string of symbols. The object also contains markers giving the beginning and end of paragraphs, which are distinct blocks of text.

[2] the ocrPage also has a metaData subclass which carries extra information about each word and paragraph in the page, and about the page itself. In particular, the metaData subclass contains the following attributes in three levels.

page level:

document classification paragraph level:

compound classification other information (bounding box, justification, etc)

word level:

token classification other information (font information, numeric, punctuation etc)

For training examples, all the fields are filled in. For unseen examples, the classification information is set to null.

[3] ocrPage has methods for the following functions finding the first word on the page finding the next word on the page (null if the end of a paragraph is encountered)

finding the first word of the next paragraph on the page (null if the end of the page is encountered)

returning the current position in the page returning the meta data for the current page/paragraph/word

[4] a "header-style" definition of ocrPage is given by:

```
class ocrPage{
firstWord( );
nextWord( );
nextParagraph( );
currentPosition( );
metaPage( );
metaParagraph(firstWordIndex);
metaWord(wordIndex);
}
```

NOTE: in the classes below, the "type" attributes are a vector of entries between 0 and 1, where each entry corresponds to a particular type. If the type(s) are known definitely, the vector will have only 0–1 entries, otherwise uncertainty is measured by the fractional values. Further, the DBMatch method searches through a vector of databases (DB), one for each token type. If the token is found in a particular database, then the corresponding type is set to 1.

```
class Token{
type;
otherInfo;
token;
Token(word, meta){
  token = word;
  type = meta.type;
```

-continued

```
    otherInfo = meta.otherInfo;
  }
  DBMatch(DBs){
    for(int i=0; i<DBs.length( ); i++){
      // check if this token is in the database at index i
      thisDB = DBs.elementAt(i);
      if (thisDB.isIn(token))
        type[i] = 1;
      else
        type[i] = 0;
      }
    }
  printNNInput(inFile){
    inFile.print(otherInfo);
  }
  printNNTargets(inFile){
    inFile.print(type);
  }
}
class Compound{
  type;
  otherInfo;
  Vector Tokens;
  Compound(meta){
    type = meta.type;
    otherInfo = meta.otherInfo;
    Tokens = new Vector( );
  }
  printNNInput(inFile){
    inFile.print(otherInfo);
    for(int i=0; i<Tokens.length( ); i++)
      (Tokens.elementAt(i)).printNNTargets(inFile);
  }
  printNNTraining(inFile){
    printNNInput(inFile);
    for(int i=0; i<Tokens.length( ); i++)
      (Tokens.elementAt(i)).printNNTargets(inFile);
    inFile.print(type);
  }
}
class Document{
  type;
  Vector Compounds;
  Document(meta){
    type = meta.type;
    Compounds = new Vector( );
  }
  printNNInput(inFile){
    for(int i=0; i<Compounds.length( ); i++)
      (Compound.elementAt(i)).printNNInput(inFile);
  }
  printNNTraining(inFile){
    for(int i=0; i<Compounds.length( ); i++)
      (Compound.elementAt(i)).printNNTraining(inFile);
  }
}
public Document readPage(ocrPage page, Vector DBs) {
  Document thisDoc = new Document(page.metaPage( ));
  wordIndex = 0;
  word = page.firstWord( );
  while(word != null) {
    thisCompound = new Compound(page.metaParagraph(wordIndex));
    while(word != null) {
      thisToken = new Token(word,page.metaWord(wordIndex));
      thisToken.DBMatch(DBs); // search the DBs
      thisCompound.Tokens.addElement(thisToken);
      word = page.nextWord( );
      wordIndex++;
    }
    thisDoc.Compounds.addElement(thisCompound);
    word = page.nextParagraph( );
  }
  return thisDoc;
}
/*------------------------------------------------------------------------
NOTE: nnOutput is a structure which gives the nn prediction for a particular document.
In particular, nnOutput supplies a vector of numbers for the nn prediction on each
- Compound in the document (nnOutput.getCompoundType(compoundIndex))
- Token in the document (nnOutput.getTokenType(tokenIndex))
```

```
                                                           -continued as well as
- the Document type (nnOutput.getDocumentType( ))
-------------------------------------------------------------------------*/
public Document addNNprediction)Document thisDoc, nnOutput) {
  Document newDoc = thisDoc;
  newDoc.type = nnOutput.getDocumentType( );
  tokenIndex = 0;
  for(int i=0; i<thisDoc.Compounds.length( ); i++){
    thisComp = thisDoc.Compounds.elementAt(i);
    thisComp.type = nnOutput.getComoundType(i);
    for(int j=0; j<thisComp.Tokens.length( ); j++){
      thisTok = thisComp.Tokens.elementAt(j);
      thisTok.type = nnOutput.getTokenType(tokenIndex++);
      thisComp.Tokens.replaceElement(i,thisTok);
    }
    newDoc.Compounds.replaceElement(i,thisComp);
  }
  return newDoc;
}
/*------------------------------------------------------------------------
NOTE: the Glue routine presumes the existence of the following objects
Vector docTypes; // vector of docType objects
docType{
  threshold; // a threshold on how certain we need to be to classify a document
      // as having this type
  Vector compTypes; // vector of compType objects
}
compType{
  threshold;
  topDist; //the furthest this compound type can be from the top of the page
  botDist; //the furthest this compound type can be from the bottom of the page
}
So, for example, a document type "Journal Article" might have a threshold of 0.8, and
compTypes "Title", "Author", "Journal", "Date", "Page", "Address". The "Title"
compType may then have a threshold of 0.9, and may also need to be in the top ⅓ of the
page (that is, topDist=0.33, botDist=MAXFLOAT)
Also, maxIndex is a function which returns the position of the largest value in a numeric
array.
-------------------------------------------------------------------------*/
public Document Glue(Document thisDoc){
  Document newDoc = thisDoc;
    newDoc.Compounds = thisDoc.Compounds;
    // set all the compound types to "unknown"
    for(int i=0; i<newDoc.Compounds.length; i++){
      newComp = newDoc.Compounds.elementAt(i);
      for(int j=0; j<newComp.types.length( ); j++)
        newComp.types[j] = 0.0;
      newDoc.Compounds.replaceElement(i, newComp);
    }
    // find the document type
    int maxDocTypeIndex = maxIndex(thisDoc.type);
    thisDocType = docTypes.elementAt(maxDocTypeIndex);
    // if the document type is acceptable, process the compounds
    if(thisDoc.type[maxDocTypeIndex] < thisDocType.threshold){
      // cycle through all the compound types
      for(int i=0; i<thisDocType.compTypes.length( ); i++){
        thisCompType = thisDocType.compTypes.elementAt(i);
        bestComp = thisDoc.Compounds.elementAt(0);
        int bestCompIndex = 0;
        // find the most likely compound for this type
        for(int j=1; j<thisDoc.Compounds.length( ); j++){
          thisComp = thisDoc.Compounds.elementAt(j);
          if(thisComp.type[i] > bestComp.type[i]){
            bestComp = thisComp;
            bestCompIndex = j;
          }
        }
        // now see if the most suitable compound is acceptable. If so,
        // set it to type i. yUp gives the vertical coordinate of the upper
        // side of the compound's bounding box, yDown of the lower side.
        if((bestComp.type[i] < thisCompType.threshold) AND
          ((bestComp.yUp < topDist) OR (bestComp.yDown > botDist)))
          {
            bestComp.type[i] = 1;
            newDoc.Compounds.replaceElement(baseCompIndex,bestComp);
          }
      }
    }
    return newDoc;
  }
```

-continued

```
  else {
    System.out.println("Document does not fit any current document types");
    return thisDoc;
    }
   }
 }
/*------------------------------------------------------------------------
Main function - this calls the above algorithms. It presumes the existance of the following
extra functions:
  - make DBs returns a vector of all the necessary DBs.
  - trainNN takes a file of NN training data and trains a NN.
  - printDoc prints the final results of an analyzed document in some acceptable form.
Main takes command line arguments for either NN learning or analysis as follows.
Learning
--------
[0] D (make training data)
    [1] name of file to put the training data in
    [2—>] ocrPages with training meta data for NN learning
[0] T (train a network)
    [1] name of file containing training data
[0] N (make training data AND train a network)
    [1] name of file to put training data in
    [2—>] ocrPages with training meta data for NN learning
Analysis
--------
(presumes a file containing the NN prediction for the input data on each ocrPage)
[0] A (Analysis) [1—>] according to [2*i–1] ocrPage i
                                    [2*i] NN prediction on page i
------------------------------------------------------------------------*/
main(String[ ] args){
  DBs = makeDBs( );
  if(args[0] == "D"){ // create learning data
    File NNTrainFile = args[1];
    for(int i=2; i<args.length( ); i++){
      thisDoc = readPage(args[i], DBs);
      thisDoc.printNNTraining(NNTrainFile);
    }
  }
  else if(args[0] == "T"){ // train network
    File NNTrainFile = args[1];
    NNTrain(NNTrainFile);
  }
  else if(args[0] == "N"){ // create data and train
    File NNTrainFile = args[1];
    for(int i=2; i<args.length( ); i++){
      Document thisDoc = readPage(args[i],DBs);
      thisDoc.printNNTraining(NNTrainFile);
    }
    NNTrain(NNTrainFile);
  }
  else if(args[0] == "A") { // analysis of NN predictions
    numDocs = (args.length( ) – 1)/2;
    for(int i=0; i< numDocs; i++){
      thisDoc = readPage(args[2*i+1],DBs);
      nnOutput = args[2*i+2];
      // add the NN output results to the document
      thisDoc = addNNPrediction(thisDoc, nnOutput);
      // now apply Glue to this document
      thisDoc = Glue(thisDoc);
      printDoc(thisDoc);
    }
  }
}
```

We claim:

1. A method of automatically extracting metadata from a document, the method comprising:

(a) providing:
   a computer readable document including blocks comprised of words,
   an authority list, including common uses of a set of words, and
   a neural network trained to extract metadata from compounds;

(b) locating authority information associated with the words by comparing the words with the authority list;

(c) creating compounds, a first of the compounds describing a first of the blocks and including:
   first-block words,
   descriptive information associated with one of the first-block and the first block words, and
   authority information associated with one first-block word;

(d) processing the compounds through the neural network to generate metadata guesses; and (e) deriving the metadata from the metadata guesses.

2. A method as in claim 1, in which step (a) additionally includes providing a document knowledge base including positioning information and size information for metadata in known documents; and the method additionally comprises before step (e):
deriving analysis data from the metadata guess; and
comparing the analysis data to the document knowledge base to improve the metadata guesses.

3. A method as in claim 1, in which the descriptive information includes bounding box information describing the size and position of the first of the blocks.

4. A method as in claim 1, in which the descriptive information includes font information for the first-block words.

5. A method as in claim 1, in which the metadata guesses include:

compound guesses, a first of the compound guesses indicating a possible block type for the first of the blocks, and document guesses, a first of the document guesses indicating a possible document type for the computer readable document.

6. A method as in claim 5, in which the metadata guesses additionally include:

word guesses, a first of the word guesses indicating a possible word type for the one first-block word.

7. A method as in claim 5, in which the first of the compound guesses includes a compound confidence factor indicating a likelihood that the possible block type is correct.

8. A method as in claim 5, in which the first of the document guesses includes a document confidence factor indicating a likelihood that the possible document type is correct.

9. A method as in claim 2, in which the metadata guesses includes:

compound guesses, a first of the compound guesses including:
a possible block type for the first of the blocks, and
a compound confidence factor indicating a likelihood the possible block type is correct; and document guesses, a first of the document guesses including:
a possible document type for the computer readable document, and
a document confidence factor indicating a likelihood that the possible document type is correct.

10. A method as in claim 9, in which the analysis data includes:
the first of the compound guesses and the first of the document guesses.

11. A method as in claim 9, in which the analysis data of step (d) includes:
proximate block type data derived by comparing the first of the compound guesses against a second of the compound guesses,
the second of the compound guesses including a possible block type for a second of the blocks located on the computer readable document proximate to the first of the blocks.

12. A method as in claim 3, in which the bounding box is a first bounding box and the analysis data includes:
proximate block position data derived by comparing the first bounding box information with a second bounding box information,
the second bounding box information describing the size and position of a second of the blocks located on the computer readable document proximate to the first of the blocks.

13. A method as in claim 3, in which the analysis data of step (d) includes:
page position data derived from the bounding box information.

14. A method as in claim 4, in which the analysis data of step (d) includes:
font data derived from the font information.

15. A method as in claim 1, in which providing a computer readable document includes:
scanning a paper document to create scanner output; and
performing an optical character recognition operation on the scanner output.

16. A method of automatically extracting metadata from a document, the method comprising:

(a) providing:
a computer readable document including blocks comprised of words,
an authority list, including common uses of a set of words,
a neural network trained to extract metadata from compounds, and
a document knowledge base including positioning information and size information for metadata in known documents;

(b) locating authority information associated with the words by comparing the words with the authority list;

(c) creating compounds, a first compound describing a first of the blocks and including:
first-block words,
descriptive information associated with one of the first of the blocks and the first-block words, the descriptive information including:
a first bounding box information describing the size and position of the first of the blocks, and
font information describing one of the first-block words, and
authority information associated with one of the first-block words;

(d) processing the compounds through the neural network to generate metadata guesses including:
word guesses, a first of the word guesses indicating a possible word type for the one of the first-block words,
compound guesses, a first of the compound guesses indicating a possible block type for the first of the blocks and including a compound confidence factor indicating a likelihood that the possible block type is correct, and
document guesses, a first of the document guesses indicating a possible document type for the computer readable document and including a document confidence factor indicating the likelihood that the possible document type is correct;

(e) deriving analysis data from the metadata guesses, the analysis data including:
the first of the compound guesses and the first of the document guesses,
proximate block type data derived by comparing the first of the compound guesses against a second of the compound guesses, the second of the compound guesses including a possible block type for a second of the blocks located on the computer readable document proximate to the first of the blocks,
proximate block position data derived by comparing the first bounding box information against a second bounding box information, the second bounding box information describing the size and position of the second of the blocks, page position data derived from the first bounding box information and the second bounding box information, and font data derived from the font information;

(f) comparing the analysis data to the document knowledge base to improve the metadata guesses; and (g) deriving the metadata from the metadata guesses.

* * * * *